United States Patent [19]
Yamaguchi

[11] Patent Number: 6,098,069
[45] Date of Patent: Aug. 1, 2000

[54] DATA MANAGING METHOD AND DATA MANAGING DEVICE USING THE SAME FOR MANIPULATING DATA INDEPENDENTLY FROM NETWORKS

[75] Inventor: Tomohisa Yamaguchi, Kitakatsuragi-gun, Japan

[73] Assignee: Sharp Kabushiki Kaisha, Osaka, Japan

[21] Appl. No.: 09/034,839

[22] Filed: Mar. 4, 1998

[30] Foreign Application Priority Data

Mar. 17, 1997 [JP] Japan .................................. 9-063617

[51] Int. Cl.⁷ .................................................. G06F 17/00
[52] U.S. Cl. ............................... 707/102; 707/1; 707/101
[58] Field of Search .................................. 707/1, 10, 102, 707/103, 513; 709/219, 226; 345/329, 115; 705/26; 379/142

[56] References Cited

U.S. PATENT DOCUMENTS

| | | | |
|---|---|---|---|
| 5,675,637 | 10/1997 | Szlam et al. .......................... | 379/142 |
| 5,809,248 | 9/1998 | Vidovic .................................. | 709/219 |
| 5,864,863 | 1/1999 | Burrows ................................. | 707/103 |
| 5,915,251 | 6/1999 | Burrows ................................. | 707/102 |
| 5,918,237 | 6/1999 | Montalbano ........................... | 707/513 |
| 5,956,027 | 9/1999 | Krishnamurthy ...................... | 345/329 |
| 5,963,915 | 10/1999 | Kirsch ..................................... | 705/26 |
| 5,991,809 | 11/1999 | Kriegsman ............................. | 709/226 |
| 6,011,537 | 1/2000 | Slotznick ................................ | 345/115 |

OTHER PUBLICATIONS

"MIME E–mail Encapsulation of Aggregate Documents, such as HTML (MHTML)" (J. Palme and A. Hopmann, Network Working Group Request for Comments 2110, Standards Track, Mar. 1997, pp. 1–19).

*Primary Examiner*—Wayne Amsbury
*Assistant Examiner*—Thuy Pardo
*Attorney, Agent, or Firm*—Dike, Bronstein, Roberts & Cushman, LLP; David G. Conlin

[57] ABSTRACT

As the user inputs a URL (Uniform Resource Locator) specifying specific data, the data managing method in accordance with the present invention obtains the specific data and all the constituent data composing the specific data from the network according to the reference information. Thereafter, the obtained data is reconstructed into a data file and recorded as page data, and index information in which the URL is paired with a position of each piece of data on the page data is added to the page data. Since the obtained data is saved as a single data file, the user can process the obtained data easily. Besides, since the URL used on the network is used as the index information with no modification at all, the obtained data does not lose the relevance to the original data thereof.

17 Claims, 15 Drawing Sheets

FIG. 3

| URL | POSITION INFORMATION ON PAGE DATA |
|---|---|
| http://www.foo.bar/a.html | [top of a.html] |
| http://www.foo.bar/img/B.gif | [top of B.gif] |
| http://www.foo.bar/img/C.xbm | [top of C.xbm] |
| http://www.foo.bar/img/D.jpeg | [top of D.jpeg] |

FIG. 9

| URL | TYPE OF PAGE DATA | POSITION INFORMATION ON PAGE DATA |
|---|---|---|
| http://www.foo.bar/a.html | 2 6 a | [top of a.html] |
| http://www.foo.bar/img/B.gif | 2 6 a | [top of B.gif] |
| http://www.foo.bar/img/C.xbm | 2 6 a | [top of C.xbm] |
| http://www.foo.bar/img/D.jpeg | 2 6 a | [top of D.jpeg] |
| http://www.foo.bar/b.html | 2 6 b | [top of b.html] |
| http://www.foo.bar/img/B.gif | 2 6 b | [top of B.gif] |
| http://www.foo.bar/c.html | 2 6 c | [top of a.html] |
| http://www.foo.bar/img/F.gif | 2 6 c | [top of B.gif] |
| http://www.foo.bar/img/G.xbm | 2 6 c | [top of C.xbm] |
| http://www.foo.bar/img/B.jpeg | 2 6 c | [top of D.jpeg] |

FIG. 12

| URL | PRODUCTION TIME | POSITION INFORMATION ON PAGE DATA |
|---|---|---|
| http://www.foo.bar/a.html | 96/09/10 | [top of a.html] |
| http://www.foo.bar/img/B.gif | 96/09/12 | [top of B.gif] |
| http://www.foo.bar/img/C.xbm | 95/04/10 | [top of C.xbm] |
| http://www.foo.bar/img/D.jpeg | 96/01/31 | [top of D.jpeg] |

DATA MANAGING METHOD AND DATA MANAGING DEVICE USING THE SAME FOR MANIPULATING DATA INDEPENDENTLY FROM NETWORKS

FIELD OF THE INVENTION

The present invention relates to a data managing method and data managing device employing such a method for processing the data scattered on networks and disks according to the input by the user, particularly to a data managing method and data managing device employing such a method for manipulating data independently from networks and disks.

BACKGROUND OF THE INVENTION

The WWW (World Wide Web) is a hypertext data base which has unlimited capacity and expands at an amazingly high speed. The WWW network has thereon information stored in a scattered manner, or the WWW information, which is incessantly updated and newly created with new information added onto the network. The information scattered on the WWW network is incessantly updated, and new information is created and added to the network at every moment.

A feature of the WWW network is that information resources, or WWW servers, which exist in various places in the network, are not controlled by a single administrative body, but are dependent from each other. Therefore, in order to always keep the latest information available on the network, it is essential for the information stored by the server to consistently change and grow, and also for the system per se of the network to constantly develop.

Applications to display for the client the data scattered on the network are generally called browsers. The WWW information is constructed in the HTML (HyperText Makeup Language) format. The browser reads the information stored by the server in the HTML format by using a protocol called HTTP (HyperText Transfer Protocol) to transmit and receive data via the network, and has a function to display on the screen of the monitor the text information contained in the HTML format information and the multimedia information obtained from the reference information called a URL (Uniform Resource Locator).

The URL serves like an address on the Internet to specify an individual piece of the WWW information. Some URLs represent one page on the WWW network, while others represent pieces of constituent data composing one page.

The HTML is a language to construct a page with the WWW server. The HTML data composing one page describes character strings shown on that page and positions of pieces of constituent data composing images and drawings on the page. However, the HTML data rarely describes the constituent data per se, in most cases describing only locations of the constituent data. Those locations are represented by URLs.

The unit of the WWW information displayed by the browser is the information for one page displayed in two dimensions. The information for one page is basically composed of multimedia information described in the HTML format, such as construction information, text information, reference information to other media, and images inserted according to the reference information. In some cases, the multimedia information inserted is three-dimensional.

The information for one page is composed of the above HTML and pieces of data of different formats managed with the HTML. This one page forms the unit of the WWW information acknowledged by the user, enabling the user to save or copy the WWW information acknowledged page by page.

As so far explained, it is important in the Internet environment to save and exchange with other users worthwhile WWW information both on and off the Internet.

A method to save and exchange the WWW information is to record the URL composing one page. Normally, the browser has a function of recording useful URLs. While many browsers can exchange URLs by copying the files describing those URLS, only a few browsers have successfully established the function of directly exchanging recorded URLs as an application.

Another method is to save, by copying, the whole constituent data and HTML data composing a page. There is also a tool (will be explained later in detail) for saving the WWW information as a file with the client, which is a relatively easy method to obtain the pieces of constituent data for one page.

The user only needs to bear lower expenses if he/she looks at the WWW information while no direct access is being made via the Internet, i.e., if he/she looks at the WWW information which has been saved or copied. Usually, making access on the Internet is very costly. Office users backed by their companies and those participating in or contributing to the Internet in schools and universities, or so-called power users, need not worry about the enormous expenses for utilizing the Internet. It can be also said that these users are benefiting from a very desirable network environment in which they can use large capacity lines.

By contrast, general users, especially users utilizing the dial-up user environment which is becoming increasingly popular nowadays, inevitably face the problem of cost to utilize the WWW network. Besides, no large capacity line is available, forcing the general user to utilize the network at a speed lower than a fraction of that for the power user and imposing on the general user a financial burden that increases in reverse proportion to the speed.

A typical and integral method for better operability and lower costs is to hold (cache) the information after reading it. The cached information, since being stored with the client, can be quickly read when compared with the information read via the Internet. Besides, the cached information can be exchanged by exchanging the entire cache.

There is also a method to use up the line capacity of the network for faster operations and lower costs by first reading the WWW information automatically and referring thereto later. This allows the user to look at the page without making any connection to the network by himself by keeping the page specified by the user handy, for example, store it on the disk of the client. The user can also exchange the data page by page by exchanging the information stored in this manner.

A method to save or exchange the WWW information is to use only the URL as mentioned above. This method requires a small amount of data to be transmitted or received, because the transmission and reception of the URL alone allows the exchange of the WWW information. The method has merits that the information for one page corresponds to one URL and that the URL per se does not lose its meaning even if the WWW information on the network (the original WWW information) is updated.

However, being nothing more than a mere character string, the URL carries no information. In other words, the URL per se is useless if it is not used to make a reference to the network. Therefore, if the user wants to look at the page to which a reference was made before, the user must make access to the network. Hence it can be said that the URL has limited applicability.

On the other hand, if the whole constituent data and HTML data composing a page is kept handy, it is possible to look at the page off the network.

However, if the HTML data and constituent data specified by the URL described in the HTML data are copied and saved, since the HTML data is no longer related to the other data, it becomes impossible to restore the original page. As a result, in order to display the copied or saved data on the client off the Internet, it is necessary to rewrite the URL contained in the HTML and thus change the format so that the format refers to the data on the disk of the client instead of referring to the information on the Internet, which requires complex data processing. In addition, according to this method, since the information for one page is composed of a plurality of data files, dealing with such data files becomes inevitably complicated.

Moreover, when the user wants to make a reference on the network to each original piece of constituent data for the information for one page saved in this manner, the URL for that data needs to be obtained again.

Moreover, the WWW information is incessantly updated, making the WWW information stored by the user obsolete unless attention is paid to the updating of the original information.

Moreover, the cached information for one page, although being very useful, can only be processed as one large chunk unless somehow modified. Although it is possible to produce information page by page from the cached data, complex data processing is necessary to correct the URL.

SUMMARY OF THE INVENTION

An object of the present invention is to offer a data managing method and data managing device employing such a method for saving as a data file the data that acts as the unit acknowledged by the user via the network, while successfully retaining the relevance of the data to the original data.

In order to accomplish the object, the data managing method in accordance with the present invention includes the steps of (a) obtaining a piece of specific data specified by reference information input by the user from a network;

(b) extracting reference information for specifying a piece of constituent data composing the piece of specific data from the piece of specific data;

(c) obtaining the piece of constituent data from the a network according to the extracted reference information;

(d) making and storing a data file containing the obtained piece of specific data and the obtained piece of constituent data; and (e) making and storing index information in which the reference information for the piece of specific data and for the piece of constituent data is paired with position information of the piece of specific data and of the piece of constituent data in the data file.

In the above method, the reference information means information for specifying a piece of data on the network, being comparable to the URL of the WWW. The piece of specific data means the piece of data specified by the reference information.

According to the above method, when the user wants to save the piece of specific data on the network into his/her information processing device or the like, he/she, for example, sets an input screen on the display screen so that he/she can input the reference information for specifying that piece of data. Subsequently, the user inputs the reference information, and the piece of specific data specified by the reference information is hence obtained from the network according the reference information input.

When the piece of specific data is to use another piece of constituent data to create the piece of data forming the unit acknowledged by the user, for instance the HTML data of the WWW, the reference information for a necessary piece of constituent data is extracted from the piece of specific data, and a piece of constituent data is obtained according the reference information.

Thereafter, the obtained pieces of specific and constituent data are kept together in a single data file, and the index information is produced. The index information is composed of a pair of the position in the data file and the reference information of each piece of data, exemplified as a table of contents or index for the data file. Thereafter, the data file and index information are stored in, for example, a recording medium.

Therefore, when the user wants to save a piece of data found on the network, he/she can save the piece of data as a data file in his/her client simply by making an input of the reference information for specifying that piece of data.

Moreover, according to the method, in the index information, the reference information per se used on the network is used as information for specifying each piece of data in the data file. Therefore, it is possible to save the piece of data while retaining the relevance of the piece of data to the piece of original data.

For a fuller understanding of the nature and advantages of the invention, reference should be made to the ensuing detailed description taken in conjunction with the accompanying drawings.

BRIEF DESCRIPTION OF THE DRAWINGS

FIG. 3 is an explanatory drawing showing an example of index information produced and added to a piece of page data by the data saving section in the data managing device shown in FIG. 2.

FIG. 9 is an explanatory drawing showing an example of index information in an index memory of the data display section shown in FIG. 7.

FIG. 12 is an explanatory drawing showing an example of index information produced and added to a piece of page data by a data saving section in a data managing device of the fourth embodiment.

DESCRIPTION OF THE EMBODIMENT
FIRST EMBODIMENT

The following description will discuss the first embodiment in accordance with the present invention.

Figure 2:
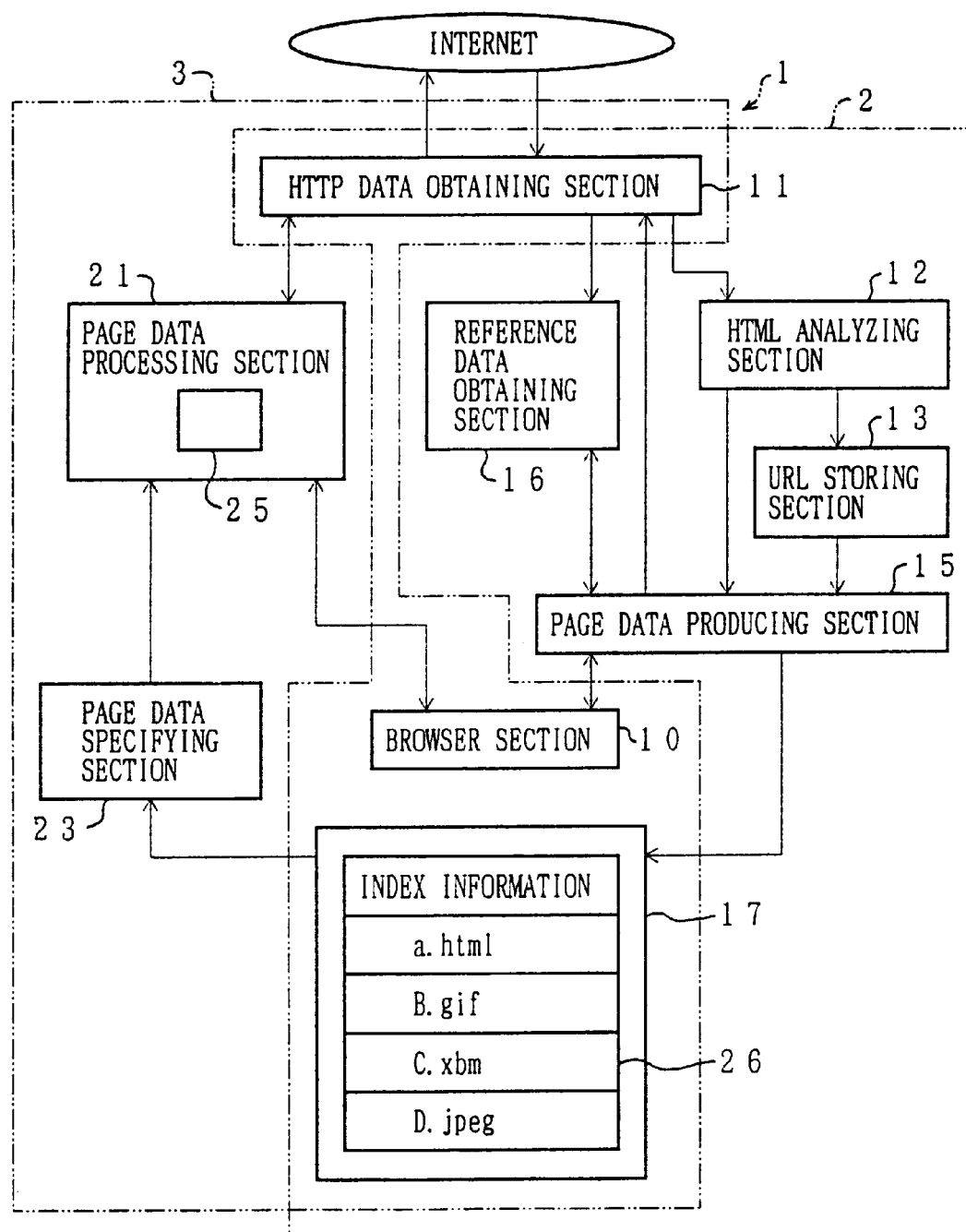
FIG. 2 is a block diagram showing an arrangement of the data managing device of the first embodiment.

FIG. 2 is a block diagram illustrating a data managing device 1 which is a data managing device of the present embodiment. As the alternate long and two short dashes lines shown in FIG. 2, the data managing device 1 includes a data saving section 2 and a data display section 3.

Throughout the following embodiments, it is presumed that the data managing device 1 is disposed in a commonly found information processing device (not shown) complete with a display screen, a keyboard, a CPU (Central Processing Unit), a recording medium, etc. It is also presumed that the data managing device 1 obtains and refers to a piece of data on the WWW and that the reference information for the piece of data is a URL.

First, the arrangement of the data saving section 2 will be explained.

As shown in FIG. 2, the data saving section 2 includes a browser section (input and display means) 10, an HTTP data obtaining section (obtaining means) 11, an HTML analyzing section (extracting means) 12, a URL storing section 13, a page data producing section (data producing means) 15, a reference data obtaining section 16, and a page data recording section (recording means) 17.

The browser section 10, upon the storage of data, receives the input by the user and transmits the input to the page data producing section 15, and upon the display of data, transmits the input by the user to a page data processing section 21. The browser section 10 interprets given data such as the HTML and, lays out and displays the data.

The HTTP data obtaining section 11 is for obtaining pieces of data from servers on the Internet with HTTP, and grouping the pieces of data into various formats including the HTML, JPEG, and GIF. The HTTP analyzing section 12 receives only the HTML data contained in the data obtained by the HTTP data obtaining section 11, extracts the URL described in that data, and stores the URL in the URL storing section 13. The HTTP analyzing section 12 transmits to the page data producing section 15 the HTML data that the HTTP analyzing section 12 receives from the HTTP data obtaining section 11.

The URL storing section 13 is for storing the URL input by the user or the URL extracted by the HTTP analyzing section 12.

The page data producing section 15 is for controlling the HTTP data obtaining section 11 to obtain data according to the URL stored in the URL storing section 13, producing a piece of page data (data file) 26 (will be described later in detail), and recording the piece of page data 26 in the page data recording section 17. The page data producing section 15 has a memory (not shown) and records necessary information in that memory.

The reference data obtaining section 16 is for reconstructing the data obtained by the HTTP data obtaining section 11 from the Internet. The HTTP data obtaining section 11, upon obtaining a piece of data, obtains a fragment of the piece at a time instead of obtaining the whole piece at a time. The reference data obtaining section 16 reconstructs the complete piece of data from those fragments. The page data recording section 17 is for recording the piece of page data 26 produced.

Here, the piece of page data 26 refers to one data file composed of the HTML data transmitted from the HTTP analyzing section 12 to the page data producing section 15, the data rebuilt by the reference data obtaining section 16, and the later mentioned index information, and is a format for storing data of one page in the data managing device 1. The index information is composed of at least the URL and the position of the data specified by the URL on the piece of page data 26, and acts as a table of contents for the piece of page data 26.

Next, the arrangement of the data display section 3 will be explained. Explanations will be omitted for members commonly used by the data saving section 2 and the data display section 3.

As shown in FIG. 2, the data display section 3 includes the HTTP data obtaining section 11, the page data recording section 17, the page data processing section (data analyzing means) 21, the browser section 10, and a page data specifying section 23.

The page data processing section 21 is for a extracting information necessary to display data such as the URL from the input by the user transmitted from the browser section 10, selecting data desired by the user from the piece of page data 26 recorded in the page data recording section 17, and transmitting that data to the browser section 10. The page data processing section 21, when the piece of page data 26 does not contain the desired data, controls the HTTP data obtaining section 11 to obtain the data via the Internet.

The page data processing section 21 has an index memory 25 for storing index information of the piece of page data 26. The page data specifying section 23 is for reading the piece of page data 26 from the page data recording section 17 and transmitting that piece of page data 26 to the page data processing section 21.

The following is an explanation about how the data managing device 1 manages WWW data. The data storing process by the data saving section 2 will be explained in reference to the flow chart shown in FIG. 1.

Upon the commencement of the data storage, the browser section 10 displays an input screen on a display screen (not shown) for the user to input a URL. As the user inputs through the keyboard (not shown) the URL specifying a particular WWW page that he/she wants to save in his/her client (S1), the browser section 10 transmits the URL to the page data producing section 15. Then the page data producing section 15 stores the URL in the URL storing section 13. (S2). Subsequently, the page data producing section 15 reads the URL from the URL storing section 13, and instructs the HTTP data obtaining section 11 to obtain the data of the WWW page specified by the URL (S3).

According the URL, the HTTP data obtaining section 11 obtains, using the HTTP, the data specified by the URL (the specific data) from the WWW server storing the page via the Internet, and determines the type of the data (S4). Thereafter the HTTP data obtaining section 11, only when the obtained data is composed of HTML data alone, transmits the data to the HTTP analyzing section 12 (S5) Then HTTP analyzing section 12 extracts all the URLs described in the HTML data and stores them in the URL storing section 13 (S6). The URLs stored in the URL storing section 13 in S6 specify pieces of constituent data necessary for composing the above page. In S6, no URL already stored in the URL storing section 13 is stored again.

After S6, the HTTP analyzing section 12 transmits to the page data producing section 15 the HTML data transmitted from the HTTP data obtaining section 11. The page data producing section 15 then records the size of the HTML data in a memory (not shown) (S7).

Thereafter, the page data producing section 15 transmits the URLs stored in the URL storing section 13, one at a time, to the HTTP data obtaining section 11 (S8 and S9), and instructs the HTTP data obtaining section 11 to obtain the data specified by the URLs (S10).

The HTTP data obtaining section 11 obtains the data specified by the URLs from the Internet and transmits the data to the reference data obtaining section 16. (S11). The reference data obtaining section 16 reconstructs a whole piece of data from fragments of data transmitted from the HTTP data obtaining section 11, and transmits that piece of data to the page data producing section 15. The page data producing section 15 stores the size of the transmitted data in the memory (S12).

S8 through S12 are repeated until all the data specified by the URLs stored in the URL storing section 13 in S2 is obtained. Thereafter the page data producing section 15 determines the final form of the piece of page data 26 according to the HTML data received in S7, and reconstructs the piece of page data 26. First, the page data producing section 15 produces index information composed of the URLs and the positions on the piece of page data 26 of the data specified by those URLs and obtained from the reference data obtaining section 16 (S13). The page data producing section 15, since having recorded the size of the data specified by each URL in the memory in S7 and S12, discerns the positions of the data on the completed piece of page data 26. This enables the page data producing section 15 to undertake S13.

FIG. 3 shows an example of the index information. The example here is very simple, being composed of URLs and the positions on the piece of page data 26 of the beginning parts of the data specified by the URLs. Although the index information does not contain the size of the data per se stored in the piece of page data 26, it is possible to show the size of the data on the header of the HTTP by storing the data specified by the URL in the HTTP format.

After S13, the page data producing section 15 compiles the HTML data transmitted from the HTTP analyzing section 12 in S7 and the data transmitted from the reference data obtaining section 16 in S12 in a single data file, and adds index information at the beginning thereof to produce the piece of page data 26 which is recorded in the page data recording section 17 (S14).

Figure 4:
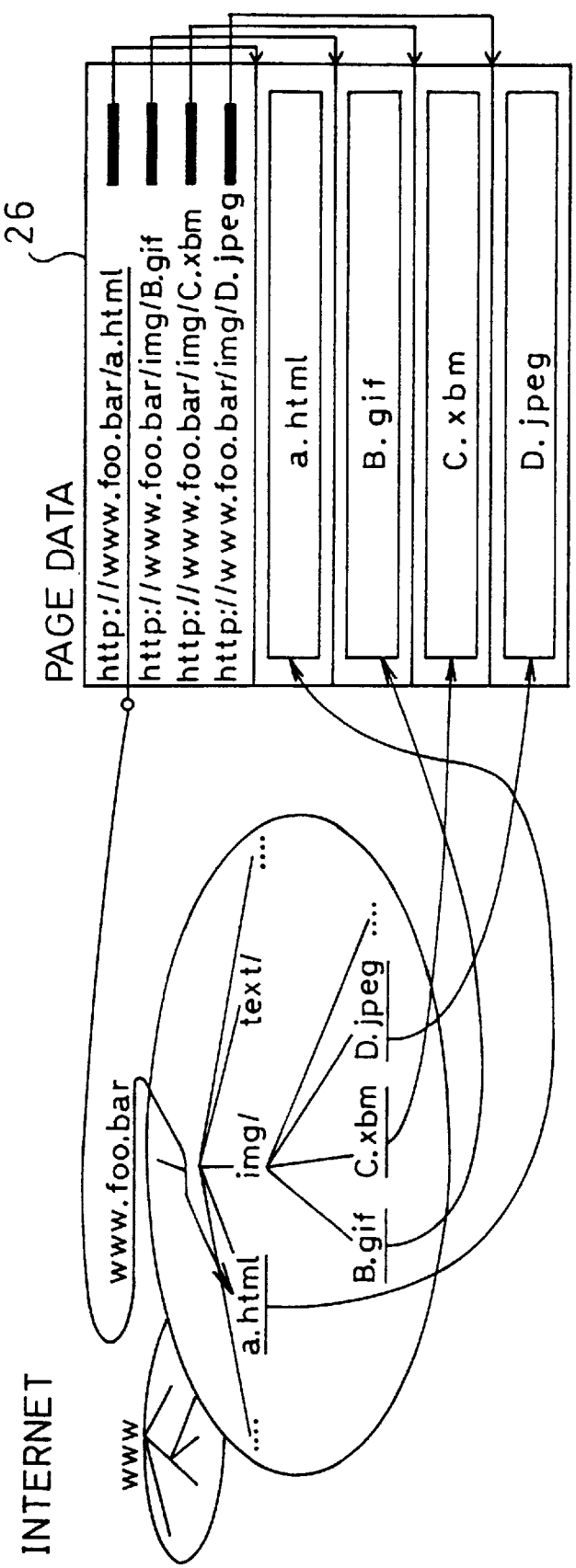
FIG. 4 is an explanatory drawing showing representations, both on the piece of page data and on the Internet for comparison, of data saved in the data saving section in the data managing device shown in FIG. 2.

FIG. 4 is an example comparing the piece of page data 26 and the data format on the Internet. The HTTP format is taken for convenience. As illustrated by FIG. 4, the data specified by the URL is represented as a file under a host (www.foo.bar in FIG. 4) on the Internet. For example, a.html is right under the host, while B.gif, C.xbm, and D.jpeg are under www.foo.bar/img under the host. The route directory is labeled "/". The data, e.g. a.html, is described as http://www.foo.bar/a.html with a URL. This representation specifies the data. In the index information shown in FIG. 3 are described http://www.foo.bar/a.html, which is a URL, and the position of a.html on the piece of page data 26.

The data storing process by the data saving section 2 explained above enables all the information for a page of WWW to be saved as the piece of page data 26 which is a data file.

Next, the WWW data display process by the data display section 3 will be explained in reference to FIGS. 5(a) and 5(b).

As the piece of page data 26 is obtained, for example, through the production by the data saving section 2 or through the copying of the piece of page data 26 produced by another client to the page data recording section 17 (S20), the page data specifying section 23 transmits the piece of page data 26 to the page data processing section 21 (S21). The page data processing section 21 reads in the index information of the transmitted piece of page data 26 and couples the index information to the index memory 25 in the page data processing section 21 to facilitate the process (S22). The preparation for display is hence completed, permitting the input by the user.

After S22, the input screen is displayed on the display screen (not shown) by the browser section 10 for the user to input URLs. When the user wants to look at the data specified by a URL (the specific data), the user inputs the URL on the input screen through the keyboard (not shown) or the like. The URL input by the user is not necessarily a URL that specifies the whole data for a page, but may be a URL that specifies a piece of constituent data composing the page. This input method by the user is employed in the following second to fifth embodiments as well as in the present embodiment.

As the user inputs a URL, the browser section 10 requests the data specified by the URL input from the page data processing section 21 (S23). The page data processing section 21 extracts the URL in response to the request transmitted from the browser section 10 (S24), and searches the index information in the index memory 25 to determine whether or not the data specified by the URL exists in the piece of page data (S25). In other words, the page data processing section 21 determines whether or not the URL is described in the index information.

When the desired URL is found in the index information, the page data processing section 21 obtains the data specified by the URL from the piece of page data, using the position information on the piece of page data which is paired with the URL in the index information, and transmits the data to the browser section 10 (S26). When the desired URL is not found in the index information, the page data processing section 21 controls the HTTP data obtaining section 11 to obtain the data specified by the URL from the Internet, and transmits the data to the browser section 10 (S27). Thereafter, the browser section 10 displays the data obtained in S26 or S27 on the display screen (S28).

Figure 6:
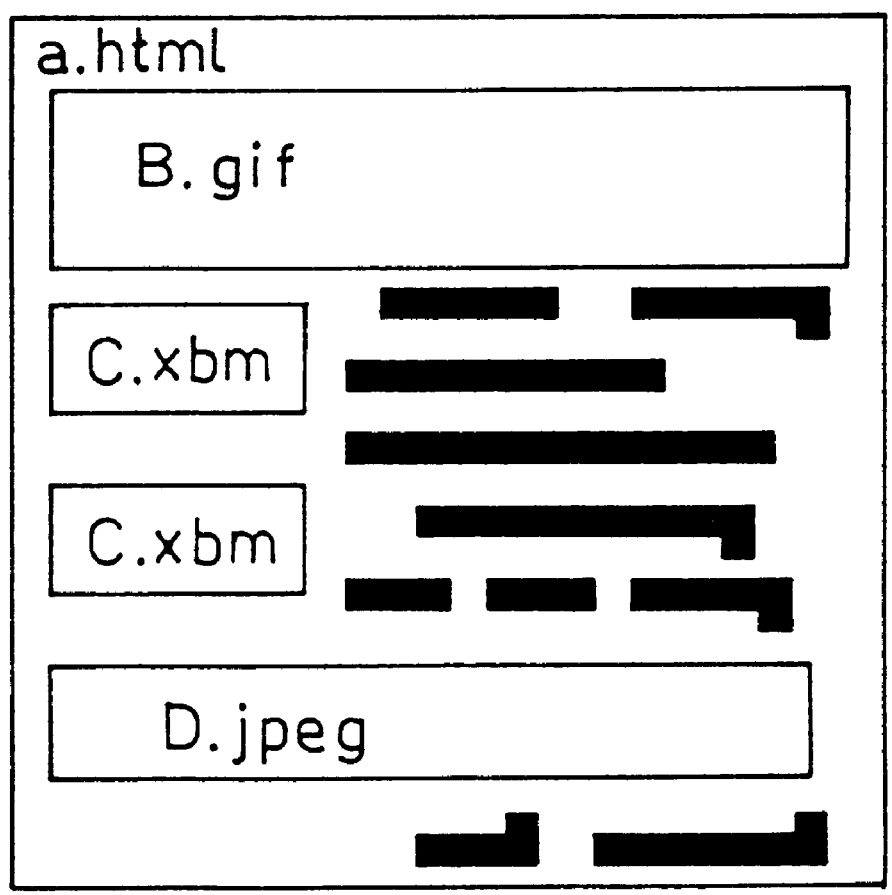
FIG. 6 is an explanatory drawing showing an example of display on the screen of a data display section in a data managing device shown in FIG. 2.

FIG. 6 is an example of data displayed by the browser section 10 in S28, illustrating the information for one page of a.html composed of constituent data such as B.gif, C.xbm, and D.jpeg. S23 through S28 are repeated in any event for the user to request obtaining new data.

As explained so far, in the data storing process by the data saving section 2 of the data managing device 1, all the information for one page of WWW is stored as the piece of page data 26 which is a data file without rewriting the URL. Therefore, the user can save the information for one page without losing the relevance to the original data, and various processes such as exchange, copying, etc. of data can be undertaken easily.

The data display process by the data display section 3 of the data managing device 1 employs the method to display the data specified by the URL in response to the URL input by the user. Therefore, even if data not stored in the page data recording section 17 is requested, the page data processing section 21 can readily obtain the original information with the HTTP data obtaining section 11. In addition, since there is no limit on the kinds of the input URL, it is possible to display not only the data for a page per se, but also the individual pieces of constituent data alone. This enables the user to process, copy or exchange the data very easily.

In addition, in the data search process in S25, the page data processing section 21 searches the index information in the index memory 25 alone, which has a fraction of volume compared with that of the whole piece of page data 26. Therefore, the data search process by the page data processing section 21 is executed quickly.

Note that the index information in the present embodiment, being composed of URLs and the positions on the piece of page data 26 of the beginning parts of the data specified by the URLs, is a very simple example. The index information may be of other kinds, such as a combination of three pieces of data including the time when the data is produced. The contents of the index information can be freely specified by the user as he/she likes.

In addition, although the page data producing section 15 processes the index information after coupling the index information into the memory in S7, there is an alternative. The page data producing section 15 may directly process the URL stored in the URL storing section 13.

In addition, there is only one piece of page data 26 recorded in the page data recording section 17. However, this is not the only possibility; the page data recording section 17 can record a plurality of pieces of page data 26. The user can distinguish between those pieces of page data by the inclusion of, for example, preferred names in the headers of the index information, which is the beginning parts of the pieces of page data, or the headers of the pieces of page data.

In addition, although the page data 26 includes all the data composing the data for one page on the network and the index information, this is not the only possibility. For example, a single piece of page data 26 may include data for two pages on the network. In this case, the index information is composed of the position on the piece of page data 26 of the data for two pages and the URL specifying the piece of constituent data. In this case, when a common piece of constituent data exists in the original pieces of data, those pieces of constituent data do not exist in duplicate on the piece of page data 26 as explained in the description for S6. Data can be easily sorted out by selecting the kinds of the plural pages collected in one piece of page data 26 from those kinds easily acknowledged by the user.

In addition, although the data display section 3 is arranged so that the page data processing section 21 is disposed between the HTTP data obtaining section 11 and the browser section 10, this is not the only possibility. The HTTP data obtaining section 11 may be disposed between the browser section 10 and the page data processing section 21, which will be explained in the fifth embodiment later.

In addition, the index memory 25 and the page data specifying section 23 may be omitted so that the page data processing section 21 directly processes the page data 26 stored in the page data recording section 17.

In addition, although the index information is added to the beginning of a piece of page data, this is not the only possibility. The index information may be added to any part of the page data. The page data and the index information may be stored separately in a recording medium or the like. In this case, there must be an arrangement that can easily relate the page data and the index information thereof in the recording medium.

SECOND EMBODIMENT

The following description will discuss the second embodiment in accordance with the present invention.

Here, for convenience, members of the present embodiment that have the same arrangement and function as members of the previous embodiment, and that are mentioned in the previous embodiment are indicated by the same reference numerals and description thereof is omitted.

In the present embodiment will be explained operations by a data display section 3 for processing a plurality of pieces of page data 26. The following description is based on the presumption that the number of pieces of page data 26 is three, being labeled the pieces of page data 26a, 26b, and 26c respectively. The arrangement and operations by the data saving section 2 are the same as those explained in the first embodiment.

Figure 7:
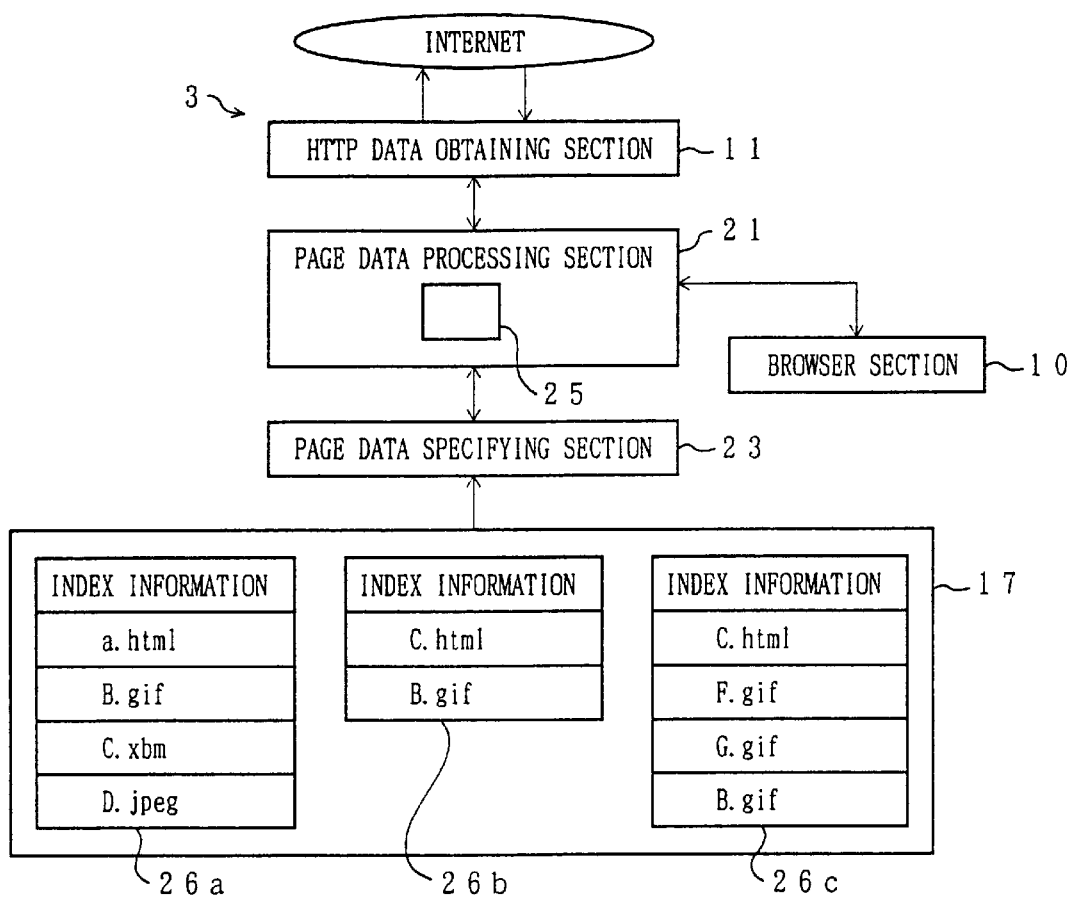
FIG. 7 is a block diagram showing an arrangement of the data display section in the data managing device of the second embodiment.

FIG. 7 is a block diagram illustrating an arrangement of a data display section 3 of a data managing device 1 of the present embodiment. As shown in FIG. 7, the data display section 3 of the present embodiment is arranged to store the plurality of pieces of page data 26a, 26b, and 26c in the page data recording section 17. In other words, the data display section 3 is arranged to process the plurality of pieces of page data 26.

Figure 8:
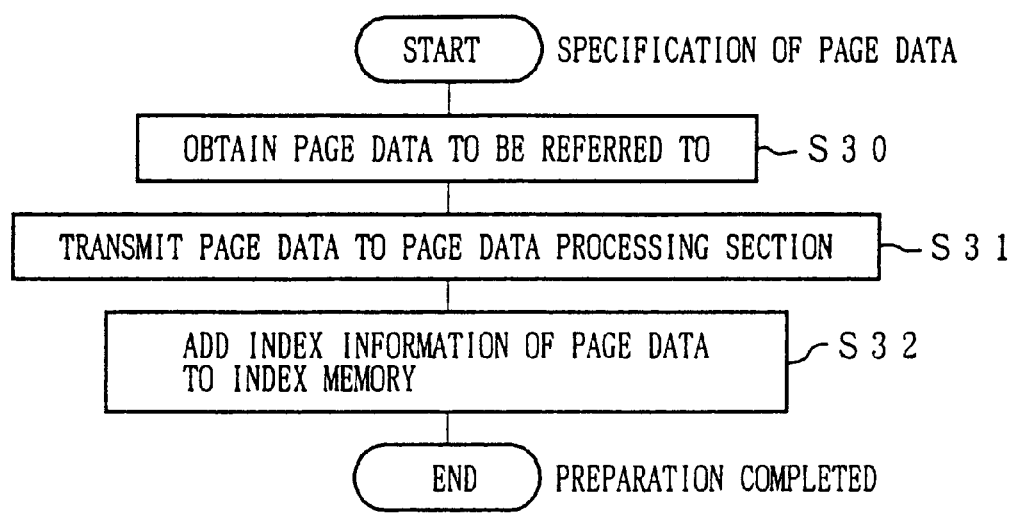
FIG. 8 is a flow chart showing a flow of preparatory operations by the data display section shown in FIG. 7 for responding to the input by the user.

In the following, a WWW data display method by the data display section 3 will be explained in reference to FIG. 8. The following description is based on the presumption that the pieces of page data 26b and 26c have been already transmitted to the page data processing section 21 and that the index information of the pieces of page data 26b and 26c have been read into the index memory 25 of the page data processing section 21.

In the same manner as in S20 explained above, as the piece of page data 26a is obtained (S30), the page data specifying section 23 transmits the piece of page data 26a stored in the page data recording section 17 to the page data processing section 21 (S31). Thereafter, the page data processing section 21 reads in the index information of the piece of page data 26a transmitted from the page data specifying section 23 and reads in the index information to the index memory 25 to facilitate the process (S32). S32 differs from S22 shown in FIG. 5(a) in that the index memory 25 in S32 contains the index information of the other pieces of page data 26b and 26c which are already read in.

FIG. 9 shows examples of index information in the index memory 25, illustrating that each piece of index information for page data 26 is treated separately from the others in the index memory 25. In other words, a single piece of data is specified out of the plurality of pieces of page data 26.

The operations thereafter are the same as in S23 through S28. Here, in S25, the page data processing section 21 searches the index information of all the page data 26 in the index memory 25. As a result, if the same URL data exists on different pieces of page data 26, one of them is hit in the search.

As explained above, in the data display process of the present embodiment, the page data processing section 21 is arranged to handle a plurality of pieces of page data 26 simultaneously. Therefore, the user can select the desired data from many pieces of page data stored. Besides, the page data processing section 21 is arranged to handle only the index information in S25. Therefore, increases in the number of pieces of page data 26 to handle does not have a serious negative effect on the processing rate.

Note that although it is presumed that the number of pieces of page data 26 is three, this is not the only possibility. The number of pieces of page data 26 can be increased as long as the capacity of the page data recording section 17, the processing capability of the page data processing section 21, etc. permit.

THIRD EMBODIMENT

The following description will discuss the third embodiment in accordance with the present invention.

Here, for convenience, members of the present embodiment that have the same arrangement and function as members of the previous embodiments, and that are mentioned in the previous embodiments are indicated by the same reference numerals and description thereof is omitted.

Figure 1:
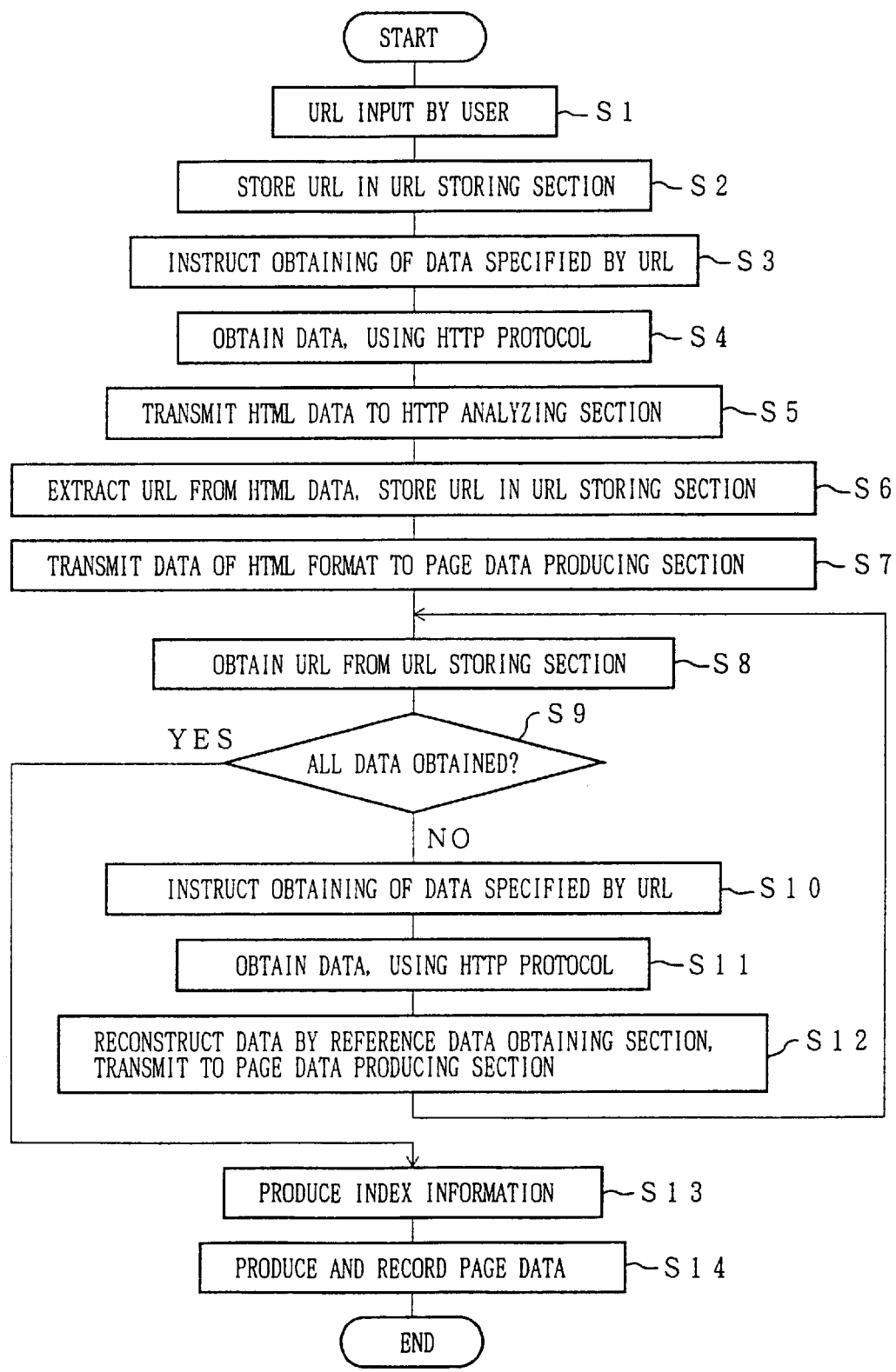
FIG. 1 is a flow chart showing a flow of operations by a data saving section in a data managing device of the first embodiment.

In the present embodiment will be explained data display operations by a plurality of page data processing sections 21 incorporated in the data display section 3 shown in FIG. 1. The arrangement and operations by the data saving section 2 are the same as those explained in the first embodiment.

Figure 10:
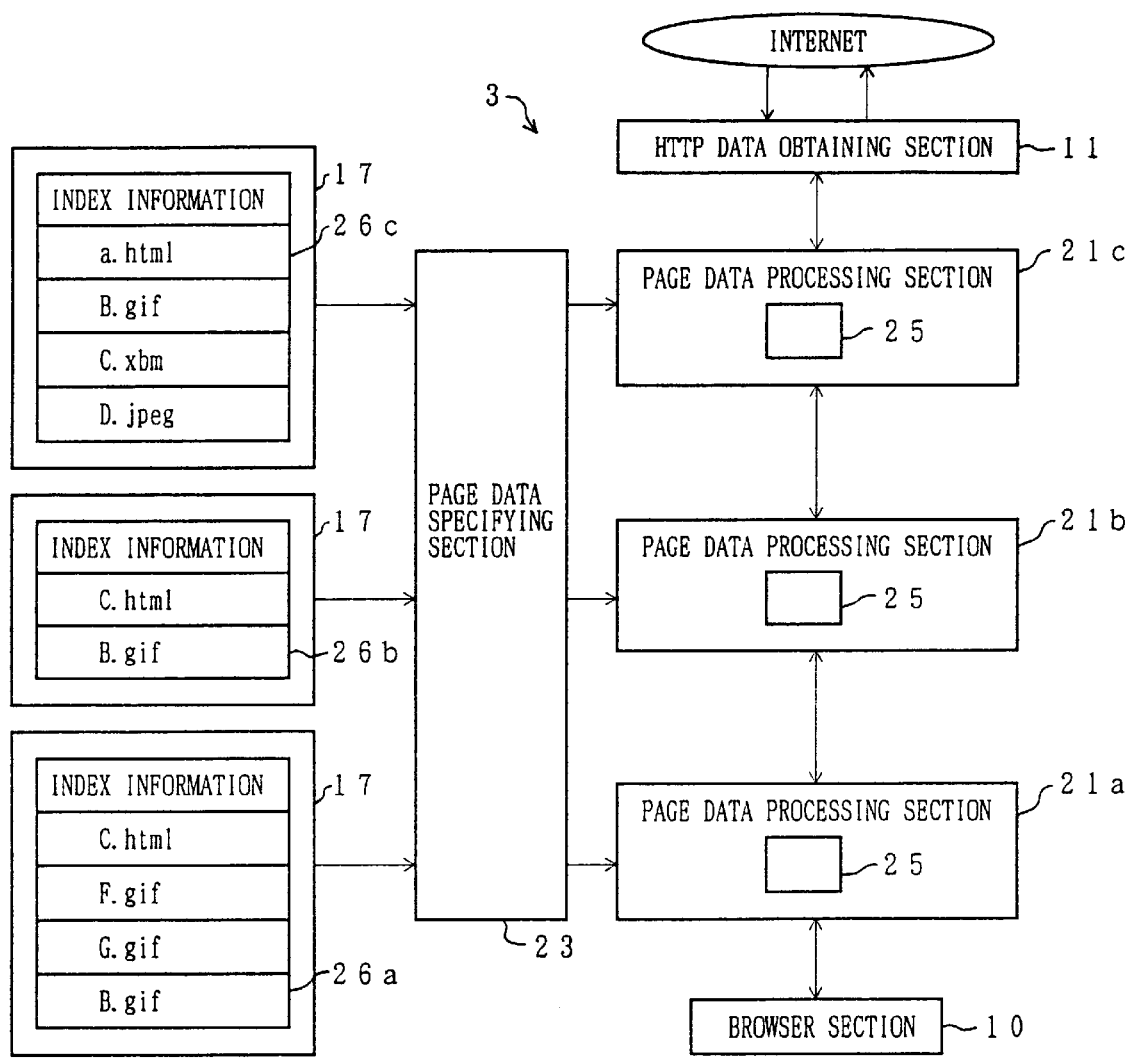
FIG. 10 is a block diagram showing an arrangement of a data display section in a data managing device of the third embodiment.

FIG. 10 is a block diagram illustrating an arrangement of a data display section 3 of a data managing device 1 of the present embodiment. As shown in FIG. 10, the data display section 3 of the present embodiment, although being arranged in the same manner as the data display section 3 of the first embodiment shown in FIG. 2, includes a plurality of page data processing section 21. The page data processing sections 21, the browser section 10, and the HTTP data obtaining section 11 are connected in series.

Each page data processing section 21 controls a single piece of page data 26. The present embodiment is based on the presumption that the number of the page data processing sections 21 is three, being labeled the page data processing sections 21a, 21b, and 21c in the order of closeness to the browser section 10, and that the page data processing sections 21a, 21b, and 21c manage respective pieces of page data 26a, 26b, and 26c.

In the following, a WWW data display method by the data display section 3 will be explained in reference to FIGS. 11(a) and 11(b). The following description is based on the presumption that the pieces of page data 26b and 26c have been already transmitted to the page data processing sections 21b and 21c, and that the index information of the pieces of page data 26b and 26c have been read into the index memories 25 of the page data processing sections 21b and 21c.

First, as shown in 11(a), after the piece of page data 26a is obtained in the same manner as in S20 (S40), the page data specifying section 23 activates the page data processing section 21a which does not yet manage page data (S41), and transmits the piece of page data 26a to the page data processing section 21a (S42). Thereafter, the page data processing section 21a reads in the index information of the piece of page data 26a and reads into the index memory 25 to facilitate the process (S43).

Next, as shown in FIG. 11(b), the user inputs on the browser section 10 the URL of the data that he/she wants to refer to (S44), the browser section 10 transmits the request including the URL input to the page data processing section 21a (S45). The page data processing section 21a, upon request, extracts the URL from the request transmitted from the browser section 10 (S46), and searches the index information in the index memory 25 to determine whether or not the desired URL exists in the piece of page data 26a (S47).

When the desired URL is found in the index information of the piece of page data 26a, the page data processing section 21a obtains the data specified by the URL from the piece of page data 26a, using the position information of the data on the piece of page data 26 which is paired with the URL in the index information (S48). When the desired URL is not found in the index information, the page data processing section 21a entrusts the request transmitted from the browser section 10 to the page data processing section 21b which is disposed on the side of the page data processing section 21a closer to the HTTP data obtaining section 11 (S49 and S50). The page data processing section 21b to which the request is entrusted repeats S46 through S48 or repeats S46, S47, S49, and S50. When the page data processing sections 21a and 21b cannot find the desired data, the request transmitted from the browser section 10 is entrusted to the page data processing section 21c. The page data processing section 21c to which the request is entrusted as the last page data processing section among the page data processing sections 21, when failing to find the desired data in the piece of page data 26c, controls the HTTP data obtaining section 11 to obtain from the Internet the data specified by the URL extracted from the request transmitted from the browser section 10 (S51).

The data obtained by one of the page data processing sections 21 in S48 or S51 is transmitted to the browser section 10 via the other page data processing section(s) 21 located between that page data processing section 21 and the browser section 10. The browser section 10 then displays the data on the display screen (S52).

As mentioned above, in the data display process of the present embodiment, the plurality of page data processing sections 21 are arranged to manage the plurality of pieces of page data 26. Therefore, the present embodiment can increase the rate of processing many pieces of page data 26.

Note that although a page data processing section 21 is assigned to manage a single piece of page data 26 in the present embodiment, this is not the only possibility. The user may determine the number of the pieces of page data 26 managed by a single page data processing section 21 as he/she likes. Also, the user may select the page data processing sections 21 undertaking the search process in S47. For example, when the user uses the page data processing sections 21 so as to manage pieces of page data 26 based on the categories thereof, the user can specify the page data processing section 21 managing the desired data to some extent. Therefore, the user can make an arrangement such that if the page data processing section 21 specified in S45 by the user to undertake the search process first fails to obtain the desired data from the piece of page data 26 managed by that page data processing section 21, the HTTP data obtaining section 11 is controlled immediately to obtain the original data without a further search process being undertaken by the other page data processing sections 21. This process can shorten the time to obtain the data.

Note also that although the page data processing sections 21 is disposed in series between the browser section 10 and the HTTP data obtaining section 11, this is not the only possible disposition. For example, the HTTP data obtaining section 11 and the browser section 10 are connected to the page data processing sections 21, the page data processing sections 21 being connected in series. In this case, the page data processing section 21 having obtained the data can transmit in S48 or S55 can transmit the data to the browser section 10 directly.

FOURTH EMBODIMENT

The following description will discuss the fourth embodiment in accordance with the present invention.

Here, for convenience, members of the present embodiment that have the same arrangement and function as members of the previous embodiments, and that are mentioned in the previous embodiments are indicated by the same reference numerals and description thereof is omitted.

In the present embodiment will be explained producing index information containing information about the time when the data is produced in the operations by the data display section 3 of the third embodiment shown in FIGS. 11(a) and 11(b). The following description is based on the presumption, in the same manner as in the third embodiment, that the number of the page data processing sections 21 is three, being labeled the page data processing sections 21a, 21b, and 21c, and that the page data processing sections 21a, 21b, and 21c manage respective pieces of page data 26a, 26b, and 26c.

In the following, a WWW data display method of the present embodiment will be explained.

First, the obtaining of pieces of page data 26 by the data saving section 2 will be explained. The reference data obtaining section 16 of the present embodiment reads the time when the original data is produced and transmits the time to the page data producing section 15 in the data reconstruction process by the reference data obtaining section 16 shown in S12 in FIG. 1 in the first embodiment. The page data producing section 15 adds the time to the index information in S13.

FIG. 12 shows examples of such index information. As shown in FIG. 12, the index information is a combination of a URL, the position of the data specified by the URL on the page data 26, and the production time of the data. The production time of data means the time when the original data is produced with the WWW server.

Figure 11:
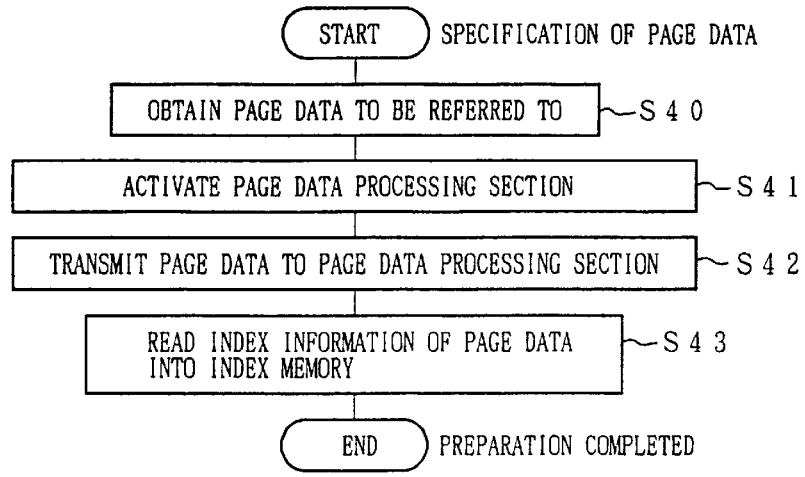
FIGS. 11(a) and 11(b) are flow charts each showing a part of a flow of operations by a data display section shown in FIG. 10, FIG. 11(a) showing the part of the flow of preparatory operations for responding to the input by the user, FIG. 11(b) showing the part of the flow of operations for displaying data in response to the input by the user.
Figure 11:
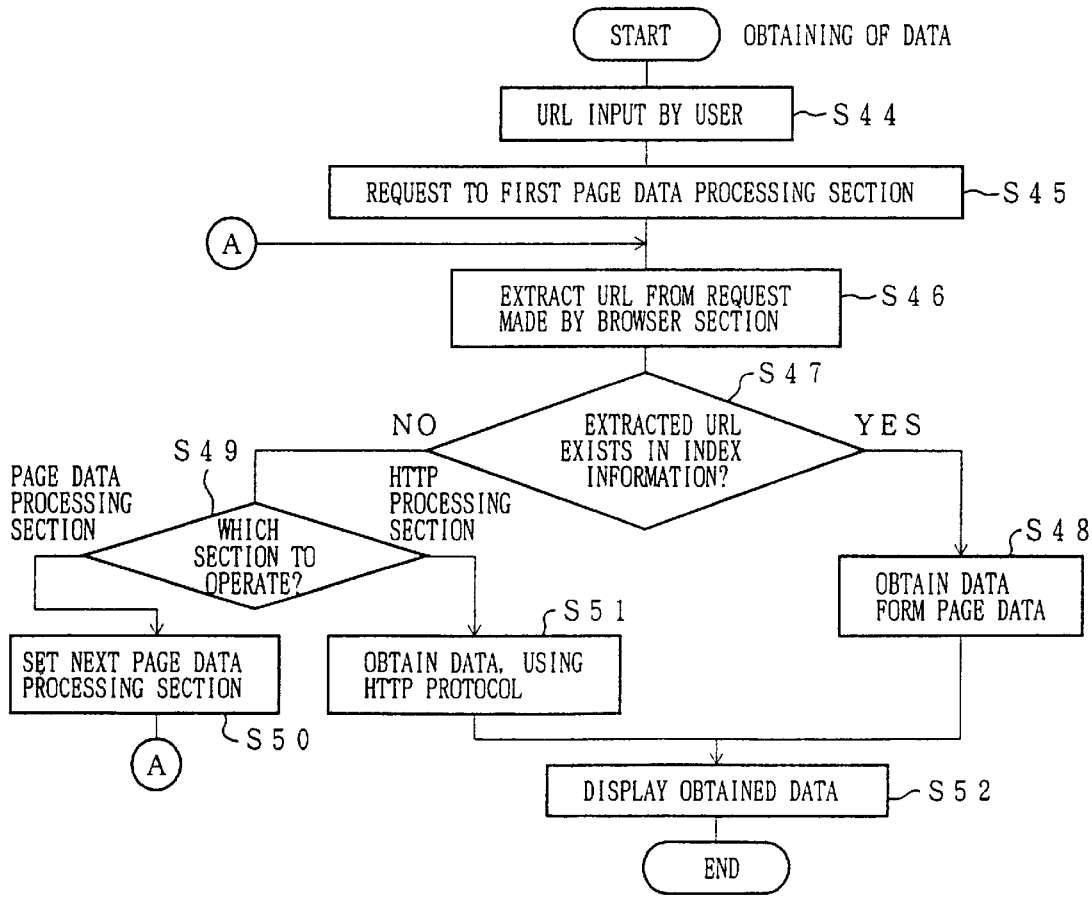

The data display process is partly the same as in S41 to S43 shown in FIG. 11: namely, pieces of page data 26 are obtained, transmitted to one of the page data processing sections 21, and read into the index memory 25.

Figure 13:
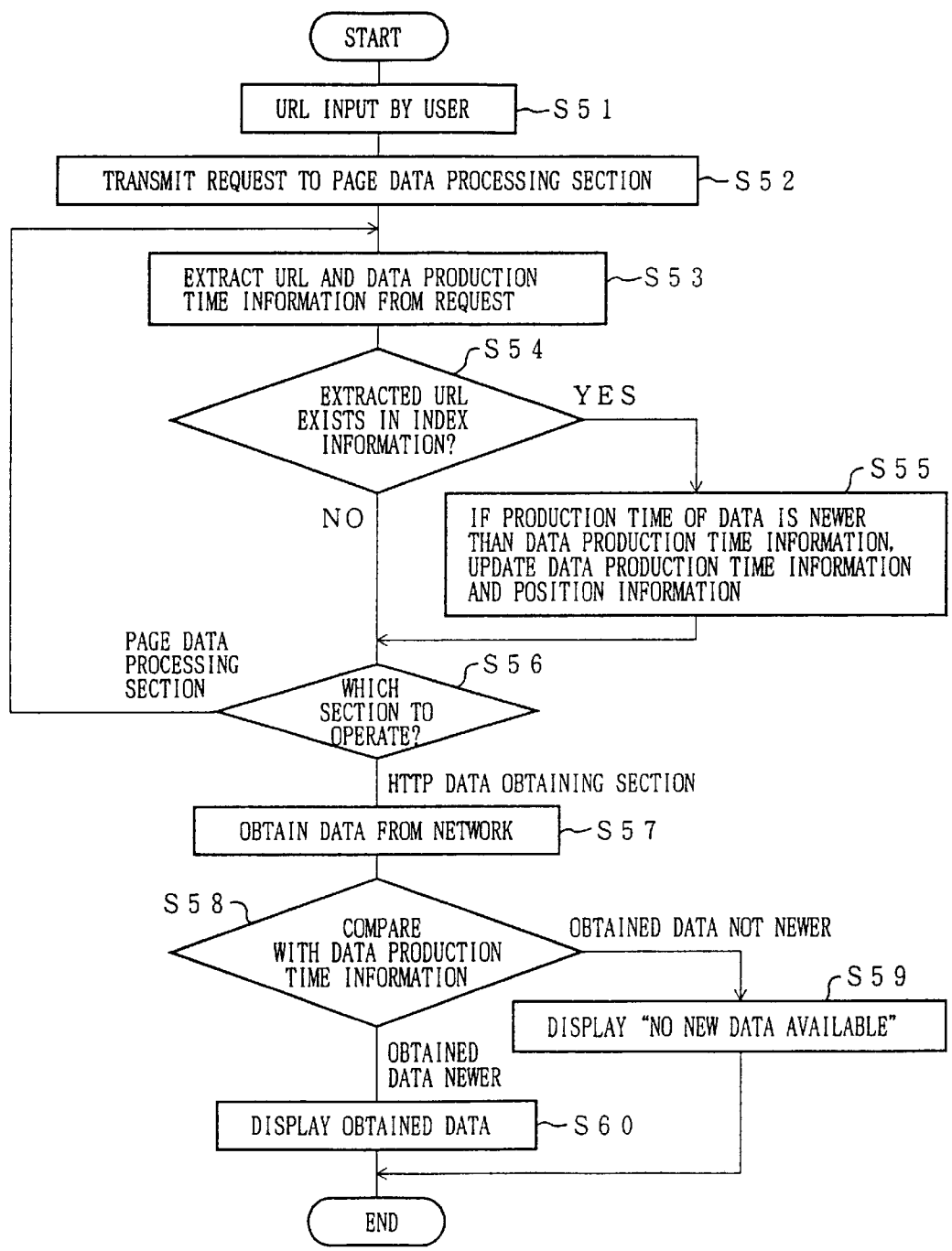
FIG. 13 is a flow chart showing a flow of operations by a data display section in the data managing device of the fourth embodiment for displaying data in response to the input by the user.

FIG. 13 is a flow chart showing illustrating the flow of operations after S43 by the data display section 3 of the present embodiment. After S43, as shown in FIG. 13, when the user inputs through the browser section 10 the URL of the page to which he/she wants to refer (S51), the browser section 10 transmits the request containing the URL to the page data processing section 21a (S52). The request transmitted from the browser section 10 in S52 contains the time representing the infinite past as the data production time information.

The page data processing section 21a, upon receiving the request, extracts the URL and the data production time information from the request transmitted from the browser section 10 (S53), and then searches the index information in the index memory 25 to determine whether or not the data specified by the URL exists in the piece of page data 26a (S54).

When the desired URL is found in the index information, the page data processing section 21a compares the production time of the data paired with the URL in the index information with the data production time information transmitted from the browser section 10 (S55). If the former is older, the data in the piece of page data 26a found in the search is regarded invalid, and the page data processing section 21a, acting as if it failed to find the desired data, entrusts the request transmitted from the browser section 10 to the page data processing section 21b (S56). Then the page data processing section 21b repeats S54 through S56. S56 is executed also when the desired data is not found in S55.

If the data found by the page data processing section 21a in S55 is newer, the page data processing section 21a designates the production time of the data found in the search as the data production time information, and transmits the data production time information to the next page data processing section 21b together with the URL and the position information of the data found (the types of the pieces of page data 26 and the positions on the pieces of page data 26) (S56). Thereafter, the page data processing section 21b repeats S54 through S56, and if data with a newer production time is found, updates the data production time information and the position information of the data.

As explained above, the page data processing section 21c, which has undertaken the last search process after the search processes by the page data processing sections 21a and 21b, controls the HTTP data obtaining section 11 and obtains the data specified by the URL and the production time thereof from the WWW server via the Internet (S57). Thereafter, the page data processing section 21c compares the production time of the obtained data with the data production time information (S58). If the former is not newer than the latter, the page data processing section 21c informs the browser section 10 that no new information requested by the user is available, and the browser section 10 displays a message of such kind on the display screen (S59). If the production time of the data obtained in S57 is newer than the data production time information, the page data processing section 21c transmits the data to the browser section 10, and the browser section 10 displays the data on the display screen (S60).

As explained above, with the data display section 3 of the present embodiment, even if pieces of data sharing the same URL is saved in respective pieces of page data 26, it is possible to choose the latest piece of data having the URL and to compare that piece of data with the original data. Therefore, when the original data is updated, it becomes possible to refer to the latest data.

Besides, even if a change is made later to the original data, it becomes possible to obtain the same data as the original data, by only saving the pieces of page data 26 in the page data recording section 17 in advance and obtaining the data contained in the changed segment.

Note that although the browser section 10 displays in S59 in the present embodiment that no new information is available, this is not the only possibility. The browser section 10 may be arranged to display, if the data obtained in S57 is not newer, the latest data saved in the pieces of page data 26 or the data obtained in S57 according to the data production time information and the position information.

Note also that although the browser section 10 is arranged to transmit the time representing the infinite past as the data production time information in S52, this is not the only possible initial value for the data production time information. The browser section 10 may be arranged to allow the user to input data production time information and transmits that input. This permits display of only the data produced after the time specified by the user.

FIFTH EMBODIMENT

The following description will discuss the fifth embodiment in accordance with the present invention. Here, for convenience, members of the present embodiment that have the same arrangement and function as members of the previous embodiments, and that are mentioned in the previous embodiments are indicated by the same reference numerals and description thereof is omitted.

In the present embodiment will be explained operations by the data display section 3 of the data managing device 1. The arrangement and operations by the data saving section 2 are the same as those explained in the first embodiment.

Figure 14:
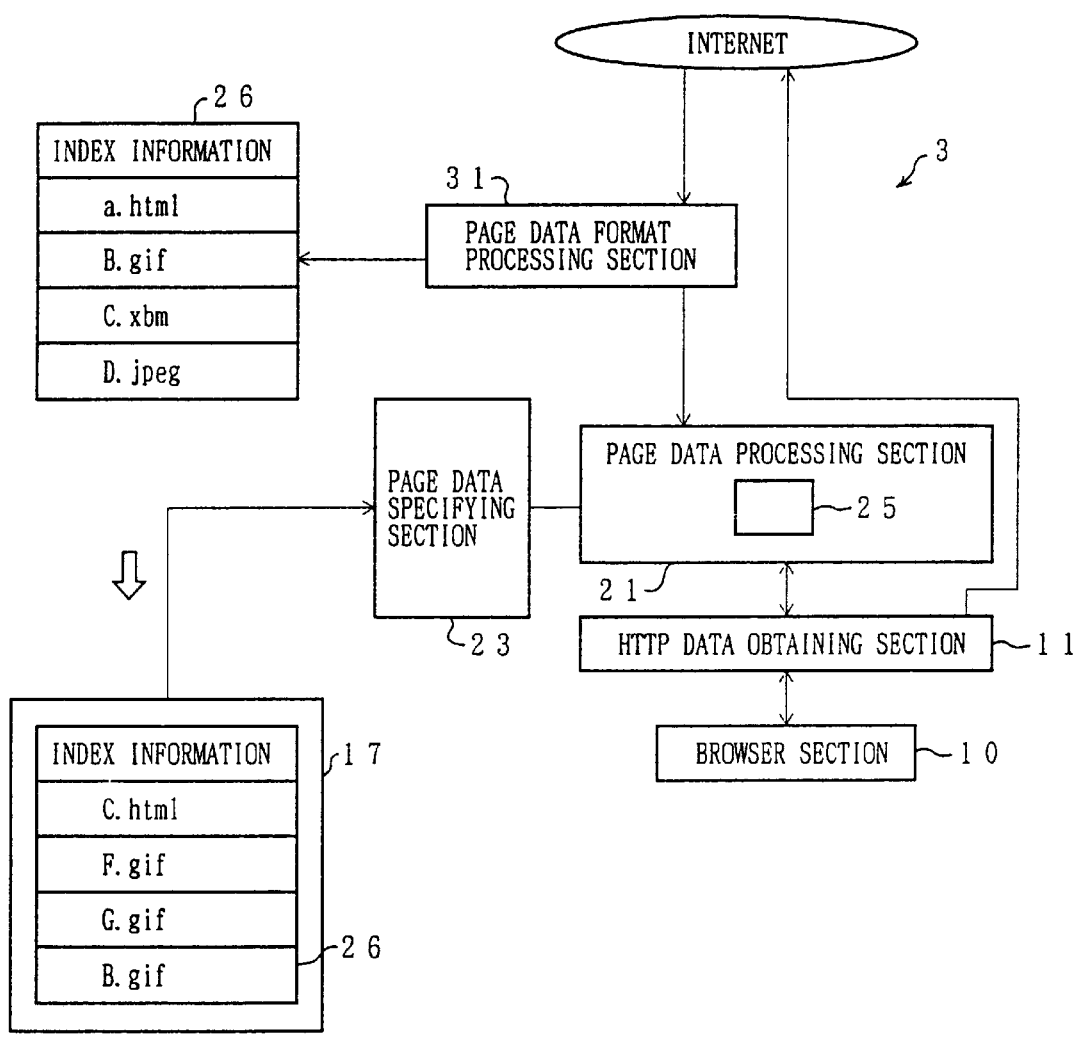
FIG. 14 is a block diagram showing an arrangement of a data display section in a data managing device of the fifth embodiment.

The data display section 3 of the data managing device 1 of the present embodiment shown in FIG. 14, basically having the arrangement of the first embodiment shown in FIG. 2, further includes a page data format processing section (first and second data distinguishing means) 31, and the page data processing section 21 and the HTTP data obtaining section 11 are interchanged. The page data format processing section 31 determines the format of the data obtained by the HTTP data obtaining section 11 before the data is transmitted to the page data processing section 21. If the data is of a format for page data 26, the page data format processing section 31 stores the data directly in the page data recording section 17, and instruct the browser section 10 to make another request.

In the following, a WWW data display method of the present embodiment will be explained in reference to FIGS. 5(a), 5(b), and 15.

Figure 5:
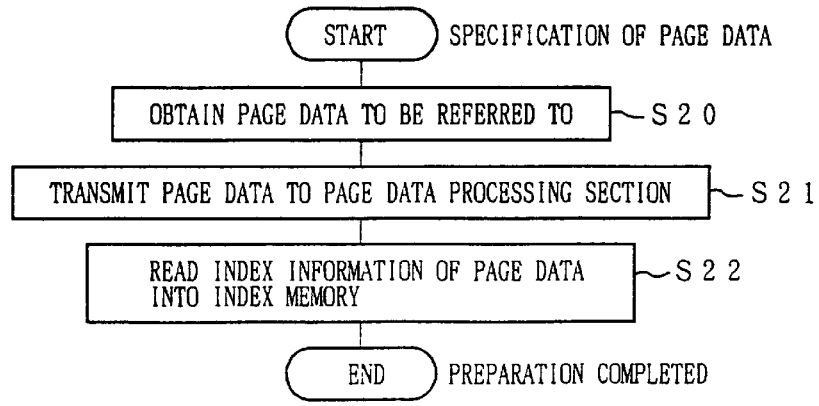
FIGS. 5(a) and 5(b) are flow charts each showing a part of a flow of operations by a data display section of a data managing device shown in FIG. 2, FIG. 5(a) showing the part of the flow of preparatory operations for responding to the input by the user, FIG. 5(b) showing the part of the flow of operations for displaying data in response to the input by the user.
Figure 5:
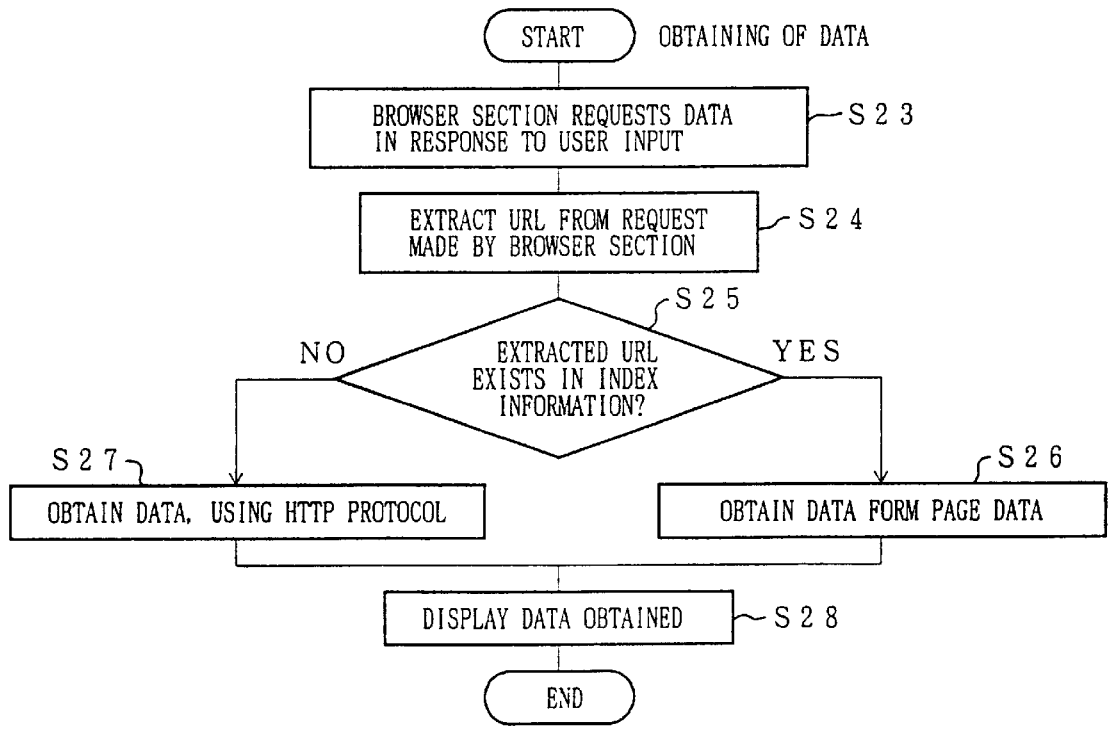

The index information of a piece of page data 26 is read in by the same operations as in S20 through S22 shown in FIG. 5(a). The search of a piece of page data 26 by the page data processing section 21 on the basis of the user input is undertaken by the same operations as in S23 through S27 shown in FIG. 5(b). However, in the present embodiment, the browser section 10 requests the URL input by the user from the HTTP data obtaining section 11 in S23, the HTTP data obtaining section 11 transmits the request to the page data processing section 21, and the page data processing section 21 undertakes S24 through S27. The data obtained by the HTTP data obtaining section 11 in S27 is transmitted to the page data format processing section 31, not to the page data processing section 21.

Figure 15:
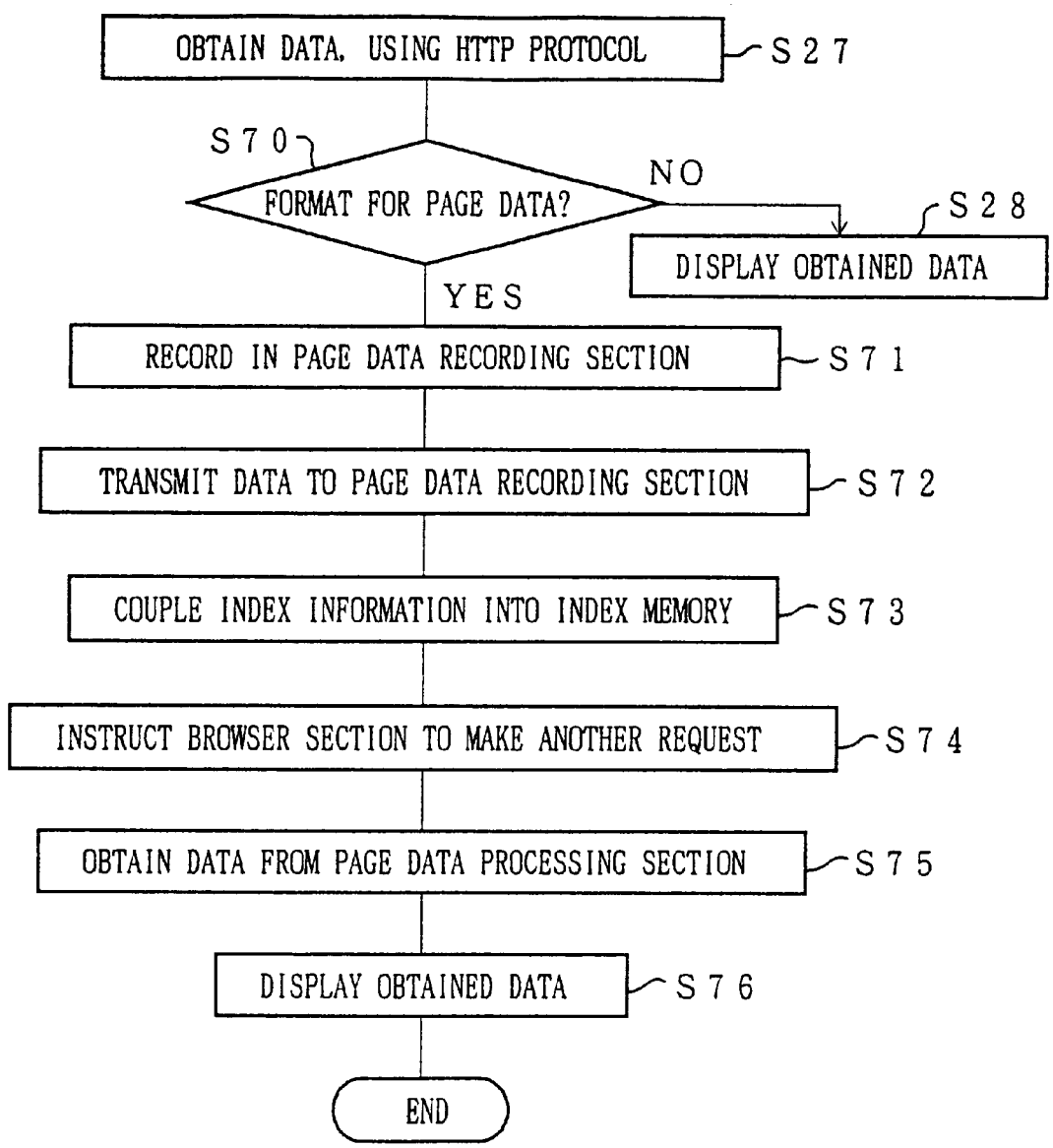
FIG. 15 is a flow chart showing a flow of operations by the data display section shown in FIG. 14.

FIG. 15 is a flow chart illustrating the flow of operations, starting with S27, by the data display section 3 of the present embodiment. After S27, as shown in FIG. 15, the page data format processing section 31 determines the format of the obtained data (S70). When the obtained data is not of the format for page data 26, the page data format processing section 31 transmits the data to the page data processing section 21, the page data processing section 21 transmits the data to the browser section 10, and the browser section 10 displays the data (S28).

When the obtained data is of the format for page data 26, the page data format processing section 31 does not transmit the data to the page data processing section 21, but stores the data in the page data recording section 17 (S71).

Thereafter, the page data specifying section 23 transmits the piece of page data 26 stored in the page data recording section 17 to the page data processing section 21 (S72). The page data processing section 21 deletes the index information in the index memory 25, and couples the index information of the newly transmitted piece of page data 26 to the index memory 25 (S73) Thereafter, the page data format processing section 31 instructs via the page data processing section 21 and the HTTP data obtaining section 11 the browser section 10 to make another request for obtaining data (S74). Thereafter, the HTTP data obtaining section 11 transmits the request made by the browser section 10 to the page data processing section 21, and the page data processing section 21 obtains data from the piece of page data 26 stored in the S71 and then transmits the data to the browser section 10 via the HTTP data obtaining section 11 (S75). Thereafter, the browser section 10 displays the data on a display screen (not shown) (S76).

As explained above, with the data display section 3 of the present embodiment, the user can send and receive the piece of page data 26 via the Internet, and the same piece of page data 26 as that obtained via the Internet from the WWW server providing the original information can be displayed. Besides, the piece of page data 26 can be displayed and saved in the page data recording section 17 at the same time.

Note that although one page data processing section 21 manages a piece of page data 26 in the present embodiment, this is not the only possibility. The present embodiment can be applied to a case where, for example, as explained in the second embodiment, one page data processing section 21 manages a plurality of pieces of page data 26. In such a case, the index memory 25 need not be deleted as shown in S73, and the embodiment only needs to be arranged so that the index information of the pieces of page data 26 transmitted in S72 is added to the index information already stored in the index memory 25. Besides, the present embodiment can be applied to an arrangement including a plurality of page data processing section 21 as shown in the third embodiment. In such a case also, the index memory 25 need not be deleted in S73, and the embodiment may either be arranged so that the page data specifying section 23 chooses the page data processing section 21 not managing the piece of page data 26 as the page data processing section 21 to which the piece of page data 26 is transmitted in S72 or adopt a method of letting the user choose the page data processing section 21 to which the piece of page data 26 is transmitted.

In S70, the page data format processing section 31 determines the format of the data by, for example, reading the description in the header part of the data, because in the HTTP protocol the type of data is described in the header part.

Moreover, although the page data 26 obtained in S76 is displayed, this is not the only possibility. If data needs not be displayed, but simply be copied, the user only needs to end the operations at S71. Alternatively, the operations may be arranged to stop at S71 by including in the header part of the data a description that the piece of page data should be saved.

Moreover, the display in S28 and the display in S76 are both undertaken based on the URL input by the user, and present no differences in operability to the user.

Moreover, although the HTTP data obtaining section 11 is disposed between the browser section 10 and the page data processing section 21, this is not the only possibility. The page data processing section 21 may be disposed between the browser section 10 and the HTTP data obtaining section 11.

Moreover, a cache may be provided to the HTTP data obtaining section 11 so that in S23 the HTTP data obtaining section 11 searches the cache before transmitting the request made by the browser section 10 to the page data processing section 21, and transmits the request to the page data processing section 21 only when the desired data is not found in the cache.

Moreover, the page data format processing section 31 may determine the format of data obtained by the HTTP data obtaining section 11 when the data is saved in the data saving section 2. That is, the page data producing section 15 may directly store that data in the page data recording section 17, if the page data format processing section 31 determine that the data is of the format for page data 26.

Moreover, the data managing devices 1 of the first through fifth embodiments may be arranged so that when the data display section 3 undertakes the display operation, after the HTTP data obtaining section 11 obtains the data not of the format for page data 26, the data saving section 2 saves that data. With the arrangement, the user can have the desired data displayed and save the data as a piece of page data 26.

As explained above, the first data managing method in accordance with the present invention, being a data managing method for processing the data scattered on a network or a disk according to the input by the user, includes the steps of:

in response to a user input of reference information specifying specific data;

obtaining the specific data from the network according to the reference information;

extracting reference information specifying all the constituent data composing the specific data from the specific data;

obtaining all the constituent data from the network according to the extracted reference information;

producing a single data file containing the specific data and all the obtained constituent data;

at the same time producing, and adding, at the beginning of the data file, index information in which the reference information specifying all the data contained in the data file is paired with the position of the data on the data file; and recording the data file.

The first data managing device, being a data managing device for processing the data scattered on a network according to the input by the user, and is arranged to include:

recording means;

input means for letting the user input reference information;

obtaining means for obtaining data from a network;

extracting means for extracting the reference information from data transmitted from the obtaining means; and data producing means for, receiving the reference information input by the user through the input means, controlling the obtaining means to obtain the data specified by the reference information, controlling the extracting means to extract the reference information of all the constituent data composing the data, controlling the obtaining means to obtain all the constituent data according to the reference information of all the constituent data, producing a data file containing the data specified by the reference information input by the user and all the constituent data obtained by the obtaining means, at the same time, adding, at the beginning of the data file, index information in which the reference information specifying all the data contained in the data file is paired with the position of the data on the data file, and recording the data file in the recording means.

According to the first data managing method and device, when the user wants to save data on the network, he/she only needs to input the reference information specifying that data, and hence can save the data in his/her client as a data file without losing the relevance to the original data.

Therefore, the user can undertake display, management, copying, exchange, etc. of data not via the Internet, but on the client. Besides, the obtained data forms a single data file, enabling the data to be processed very easily.

The second data managing method in accordance with the present invention, incorporating all the features of the first data managing method, further includes the steps of:

in response to a user input of reference information specifying specific data, determining whether or not the reference information exists in the recorded data file by searching the index information;

obtaining the data from the data file if the data exists in the data file; and obtaining the data from the network if the data does not exist in the data file.

The second data managing device, incorporating all the arrangement of the first data managing device, is arranged to further include:

display means for displaying data on a display screen; and data processing means for receiving the reference information input by the user through the input means, determining whether or not the reference information exists in the data file recorded in the recording means by searching the index information of the data file, obtaining the data from the data file and transmitting the obtained data to the display means if the data exists in the data file, meanwhile, if the data does not exist in the data file, obtaining the data from the network by controlling the obtaining means and transmitting the obtained data to the display means.

According to the second data managing method and device, by making an input of reference information, the user can obtain the data specified by the reference information from a search of the index information of the stored data file.

Therefore, if the desired data is saved, the same data as the original data can be obtained much faster and at a lower cost than via the Internet. Besides, when the user inputs reference information of data which does not exist in the stored data file, the data can be obtained from the data on the network without any hesitations.

The third data managing device in accordance with the present invention, incorporating all the arrangement of the second data managing device, is arranged so that when a plurality of data files are recorded in the recording means, the data processing means determines whether or not the reference information exists in the plurality of data files recorded in the recording means by reading the index information of all the plurality of data files and searching the index information.

According to the arrangement, the data processing means is arranged to search the plurality of data files recorded in the recording means by reading the index information of all the plurality of data files. Therefore, the user can choose the desired data from many recorded pieces of data.

The fourth data managing device in accordance with the present invention, incorporating all the arrangement of the first data managing device, is arranged so that the data producing means adds, at the beginning of the data file index, information in which the reference information specifying all the data contained in the data file is paired with the position of the data on the data file and the production time of the data.

According to the arrangement, the information about the production time of the data can be added to the index information. Therefore, the production time of the data can be used as a condition in the data search. The index information is very useful when, for example, applied to the fifth data managing device in accordance with the present invention explained in the following.

The fifth data managing device in accordance with the present invention, incorporating all the arrangement of the fourth data managing device, is arranged to further include:

display means for displaying data on a display screen; and data processing means for receiving the reference information input by the user through the input means, determining whether or not the reference information exists in the data file recorded in the recording means by searching the index information of the data file, if the data exists in the data file, choosing and obtaining from the data file the data that has been produced latest of all the data files, by comparing the production information of all the data in the data file, thereafter controlling the obtaining means to obtain the original data of the data from the network, comparing the production time of the data obtained from the data file with the production time of the original data, and transmitting the data that has been produced later to the display means, and if the data does not exist in the data file, controlling the obtaining means to obtain the data from the network and transmitting the data to the display means.

According to the above arrangement, the data processing means can transmit to the display means the data that has been produced latest of the data in the data file and the original data. Therefore, when the data is saved as a data file in the client, but the original data has been updated, the user can refer to the original data.

The sixth data managing device in accordance with the present invention, incorporating all the arrangement of the second data managing device, is arranged to further include a distinguishing means for determining whether or not the data obtained by the obtaining means controlled by the data processing means is of the same format as that for the data file, if the data is not of the same format as that for the data file, transmitting the data to the data processing means, if the data is of the same format as that for the data file, transmitting the data to the recording means as a data file, recording the data in the recording means, and transmitting the reference information input by the user through the input means to the data processing means again.

According to the arrangement, when the data that the user wants to refer to does not exist in the data file, if the data obtained from the network is of the same format as that for the data file recorded in the recording means, the data is not only displayed but also recorded as a data file in the recording means. Therefore, if the data is of the data file format, the user can save the data in the client and refer to the data on the display screen at the same time.

The invention being thus described, it will be obvious that the same may be varied in many ways. Such variations are not to be regarded as a departure from the spirit and scope of the invention, and all such modifications as would be obvious to one skilled in the art intended to be included within the scope of the following claims.

What is claimed is:

1. A data managing method, comprising the steps of:

(a) obtaining a piece of specific data specified by first reference information inputted by a user from a network;

(b) extracting second reference information different from the first reference information for specifying a piece of constituent data composing the piece of specific data from the piece of specific data;

(c) obtaining the piece of constituent data from the network according to the second reference information extracted;

(d) making and storing a data file containing the obtained piece of specific data and the obtained piece of constituent data;

(e) producing and storing index information in which the first and second reference information for the piece of specific data and for the piece of constituent data are paired with position information of the piece of specific data and of the piece of constituent data in the data file;

(f) determining whether or not the obtained piece of specific data is of the same format as that for the data file;

(g) extracting the second reference information from the piece of specific data if the piece of specific data is not of the same format as that for the data file; and (h) making and storing another data file including the obtained piece of specific data if the piece of specific data is of the same format as that for the data file.

2. The data managing method as defined in claim 1, further comprising the steps of determining whether or not a piece of specific data specified by the first reference information inputted by the user exists in the data file by searching the index information;

(g) obtaining the piece of specific data from the data file if it is determined that the piece of specific data exists in the data file;

(h) obtaining the piece of specific data from the network if it is determined that the piece of specific data does not exist in the data file; and (i) displaying the obtained piece of specific data.

3. A data managing device, comprising:

recording means;

input means for letting a user input first reference information specifying a piece of specific data;

obtaining means for obtaining a piece of data from a network;

extracting means for extracting second reference information from the piece of specific data; and data producing means for receiving the first reference information inputted by the user through the input means, controlling the obtaining means to obtain the piece of specific data specified by the first reference information, controlling the extracting means to extract the second reference information different from the first reference information of a piece of constituent data composing the piece of specific data, controlling the obtaining means to obtain the piece of constituent data according to the second reference information extracted by the extracting means, making a data file containing the obtained piece of specific data and the obtained piece of constituent data, producing index information in which the first and second reference information for the piece of specific data and for the piece of constituent data are paired with position information of the piece of specific data and of the piece of constituent data in the data file, and controlling the recording means to record the data file and the index information, further comprising first data distinguishing means for determining whether or not the piece of specific data obtained by the obtaining means is of the same format as that for the data file, wherein the data producing means controls the obtaining means to transmit the obtained piece of specific data to the first data distinguishing means, and controls the first data distinguishing means to transmit the piece of specific data to the extracting means if the piece of specific data is not of the same format as that for the data file, and to transmit the piece of specific data to the recording means as a data file if the piece of specific data is of the same format as that for the data file.

4. The data managing device as defined in claim 3, wherein the data producing means adds the index information to the data file and controls the recording means to record the data file containing the index information.

5. The data managing device as defined in claim 3, wherein the data producing means does not contain the same pieces of data in a single data file.

6. The data managing device as defined in claim 3, further comprising:

display means for displaying data on a display screen; and data processing means for receiving the first reference information inputted by the user through the input means, either obtaining a piece of specific data specified by the first reference information from the data file or obtaining the piece of specific data from the network by controlling the obtaining means, and transmitting the obtained piece of specific data to the display means.

7. The data managing device as defined in claim 6, wherein the data processing means determines whether or not the piece of specific data specified by the first reference information exists in the data file by searching the index information, and obtains the piece of specific data from the data file if having determined that the piece of specific data exists in the data file, and from the network by controlling the obtaining means if having determined that the piece of specific data does not exist in the data file.

8. The data managing device as defined in claim 7, wherein the data producing means makes a plurality of data files according to a plurality of pieces of first reference information inputted by the user, and records the plurality of data files in the recording means, and the data processing means determines whether or not the piece of specific data exists in the plurality of data files by searching the index information of the plurality of data files, and obtains a piece of specific data produced at the latest time from one of the plurality of data files if having determined that the piece of specific data exists in the data file.

9. The data managing device as defined in claim 8, wherein the data producing means produces index information in which the first and second reference information for the piece of specific data and for the piece of constituent data are paired with position information and production times of the piece of specific data and of the piece of constituent data in the data file, and the data processing means chooses the specific data produced at the latest time according to the production times.

10. The data managing device as defined in claim 6, wherein the data processing means determines whether or not the piece of specific data specified by the first reference information exists in the data file by searching the index information, obtains the piece of specific data from the data file if having determined that the piece of specific data exists in the data file, controls the obtaining means to obtain the piece of specific data from the network, and transmits one of the pieces of specific data obtained from the data file and from the network to the display means.

11. The data managing device as defined in claim 10, wherein the data processing means, if having obtained the pieces of specific data from the data file and from the network, compares the times when the pieces of specific data are produced, and, if having determined that the piece of specific data obtained from the network is produced at a later time than the piece of specific data obtained from the data file, transmits the piece of specific data obtained from the network to the display means.

12. The data managing device as defined in claim 11, wherein the data producing means makes a plurality of data files according to a plurality of pieces of first reference information inputted by the user, and records the plurality of data files in the recording means, and the data processing means determines whether or not the piece of specific data specified by the first reference information exists in the plurality of data files by searching the index information of the plurality of data files, and obtains a piece of specific data produced at the latest time from one of the plurality of data files if having determined that the piece of specific data exists in the data file.

13. The data managing device as defined in claim 12, wherein the data producing means produces index information in which the first and second reference information for the piece of specific data and for the piece of constituent data are paired with position information and production times of the piece of specific data and of the piece of constituent data in the data file, and the data processing means chooses the specific data produced at the latest time according to the production times.

14. The data managing device as defined in claim 6, wherein the data processing means receives a data production time inputted by the user through the input means, and obtains only a piece of specific data produced at a later time than the data production time.

15. The data managing device as defined in claim 14, wherein the data processing means, if having failed to obtain an original piece of specific data produced at a later time than the data production time, controls the obtaining means to obtain the original piece of specific data from the network.

16. The data managing device as defined in claim 7, wherein the data producing means makes a plurality of data files according to a plurality of pieces of first reference information inputted by the user, and records the plurality of data files in the recording means, the data processing means, being given in plurality, search respective data files, and one of the data processing means controls the obtaining means to obtain the piece of specific data from the network.

17. The data managing device as defined in claim 8, wherein the data processing means searches only a data file specified by the user.

* * * * *